United States Patent
Otterstedt

(10) Patent No.: US 11,620,507 B2
(45) Date of Patent: Apr. 4, 2023

(54) APPARATUS AND METHODS FOR DETECTING A PROPERTY FROM ELECTROMAGNETIC RADIATION SENSOR DATA

(71) Applicant: Infineon Technologies AG, Neubiberg (DE)

(72) Inventor: Jan Otterstedt, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 1324 days.

(21) Appl. No.: 15/983,736

(22) Filed: May 18, 2018

(65) Prior Publication Data

US 2018/0341858 A1 Nov. 29, 2018

(30) Foreign Application Priority Data

May 23, 2017 (DE) ...................... 10 2017 111 215.4

(51) Int. Cl.
*G06N 3/08* (2006.01)
*G02F 1/21* (2006.01)
(Continued)

(52) U.S. Cl.
CPC ................ *G06N 3/08* (2013.01); *G02F 1/21* (2013.01); *G06V 10/143* (2022.01);
(Continued)

(58) Field of Classification Search
CPC ...... G02F 1/21; G02F 1/213; G02F 2201/346; G06F 3/017; G06N 3/04; G06N 3/08;
(Continued)

(56) References Cited

U.S. PATENT DOCUMENTS

2008/0095298 A1* 4/2008 Shefsky .................. G01T 1/295
250/358.1
2009/0052008 A1* 2/2009 Mcnie .................... G02B 5/281
359/290

(Continued)

OTHER PUBLICATIONS

M. Salman Asif, "FlatCam: Thin, Bare-Sensor Cameras using Coded Aperture and Computation", Jan. 27, 2016, Computer Vision and Pattern Recognition,arXiv:1509.00116,pp. 1-11.*

(Continued)

*Primary Examiner* — Omar S Ismail
(74) *Attorney, Agent, or Firm* — Harrity & Harrity, LLP

(57) ABSTRACT

An apparatus includes a sensor module. The sensor module includes an electromagnetic radiation sensor configured to provide electromagnetic radiation sensor data. The sensor module further includes a coded mask configured to modulate electromagnetic radiation incident to the electromagnetic radiation sensor and from which the electromagnetic radiation sensor data is generated. The apparatus further includes a computation module configured to obtain the electromagnetic radiation sensor data from the electromagnetic radiation sensor. The computation module is further configured to detect a property from the electromagnetic radiation sensor data using an artificial neural network. The computation module is further configured to output information related to the detected property via an output.

20 Claims, 5 Drawing Sheets

(51) Int. Cl.
G06V 10/143 (2022.01)
G06V 10/145 (2022.01)
G06V 40/10 (2022.01)
G06N 3/04 (2006.01)
G06V 40/20 (2022.01)
G06V 40/16 (2022.01)
G06F 3/01 (2006.01)

(52) U.S. Cl.
CPC .......... *G06V 10/145* (2022.01); *G06V 40/113* (2022.01); *G02F 1/213* (2021.01); *G02F 2201/346* (2013.01); *G06F 3/017* (2013.01); *G06N 3/04* (2013.01); *G06V 40/161* (2022.01); *G06V 40/20* (2022.01)

(58) Field of Classification Search
CPC .... G06V 10/143; G06V 10/145; G06V 10/82; G06V 40/113; G06V 40/161; G06V 40/20
See application file for complete search history.

(56) References Cited

U.S. PATENT DOCUMENTS

| | | | | |
|---|---|---|---|---|
| 2009/0114824 A1* | 5/2009 | Zelakiewicz | ........... | G01T 1/295 250/363.02 |
| 2009/0279737 A1 | 11/2009 | Strens | | |
| 2012/0099702 A1* | 4/2012 | Engel | ..................... | A61B 6/484 378/62 |
| 2014/0064264 A1* | 3/2014 | Morita | .................. | H04W 56/00 370/350 |
| 2014/0243971 A1* | 8/2014 | Pugh | ..................... | A61F 2/1624 623/6.22 |
| 2014/0276090 A1* | 9/2014 | Breed | .................. | A61B 5/1455 600/473 |
| 2015/0331228 A1* | 11/2015 | Horstmeyer | ......... | G02B 21/361 348/79 |
| 2016/0077166 A1* | 3/2016 | Morozov | ........... | G01R 33/0286 702/150 |
| 2017/0247751 A1* | 8/2017 | Humphrey | ........... | G01N 21/645 |
| 2018/0294410 A1* | 10/2018 | Afzali-Ardakani | ......................... | H01L 21/385 |

OTHER PUBLICATIONS

Michael Illiadis , "DeepBinaryMask: Learning a Binary Mask for Video Compressive Sensing",Jul. 18, 2016, Computer Vision and Pattern Recognition,arXiv:1607.03343,pp. 1-10.*

Junko Yoshida, "Race for AI Chips Begins", EETimes Connecting the Global Electronics Community, Dec. 2016.

Patrick Gill et al., "Lensless Smart Sensors: Optical and Thermal Sensing for the Internet of Things", IEEE, 2016.

Asif M.S. et al., "FlatCam: Thin, Bare-Sensor Cameras using Coded Aperture and Computation", Jan. 27, 2016, arXiv.org > cs > arXiv:1509.00116v2, 12 pgs.

Zhang, Guoqiang Peter, "Neural Networks for Classification: A Survey", IEEE Transactions on Systems, Man, and Cybernetics, Part C: Applications and Reviews, vol. 30, No. 4, Nov. 2000, pp. 451-462.

Ballesteros F. et al., "Speeding up image reconstruction methods in coded mask γ cameras using neural networks Application to the EM algorithm", Experimental Astronomy 11: 207-222, 2001.

Bailey, Brian, Bailey, B.: New memories and architectures ahead. In: Semiconductor Enigineering. Feb. 13, 2017, URL: https://semiengineering.com/new-memoriesand- architectures-ahead [retrieved Feb. 23, 2018].

Resistive RAM. In: Semiconductor Engineering. Feb. 21, 2017, URL: https://semiengineering.com/kc/knowledge_center/Resistive-RAM/94 [retrieved Feb. 23, 2018].

* cited by examiner

APPARATUS AND METHODS FOR DETECTING A PROPERTY FROM ELECTROMAGNETIC RADIATION SENSOR DATA

RELATED APPLICATION

This application claims priority to German Patent Application No. 102017111215.4, filed on May 23, 2017, which is incorporated herein by reference in its entirety.

FIELD

This disclosure relates to an apparatus and a method for detecting a property from electromagnetic radiation sensor data, and to a method for manufacturing an apparatus for detecting a property from electromagnetic radiation sensor data, more specifically, but not exclusively, detecting the property using an artificial neural network.

BACKGROUND

The detection of properties of electromagnetic radiation, for example, visual properties for motion and gesture detection, is a topic of interest in research and engineering. For example, mobile devices, such as smartphones, or game consoles, may be controlled based on such detected motion and gestures.

SUMMARY

There may be a demand for an improved concept for electromagnetic radiation sensor apparatuses, which may enable a thinner profile of the sensor apparatus. Such a demand may be satisfied by the subject of the independent claims.

One or more embodiments relates to an apparatus including a sensor module. The sensor module includes an electromagnetic radiation sensor configured to provide electromagnetic radiation sensor data. The sensor module further includes a coded mask configured to modulate electromagnetic radiation incident to the electromagnetic radiation sensor. The apparatus further includes a computation module configured to obtain the electromagnetic radiation sensor data from the electromagnetic radiation sensor. The computation module is further configured to detect a property from the electromagnetic radiation sensor data using an artificial neural network. The computation module is further configured to output information related to the detected property via an output.

An example relates to a method. The method includes sensing electromagnetic radiation modulated by a coded mask to obtain electromagnetic radiation sensor data. The method further includes detecting a property from the electromagnetic radiation sensor data using an artificial neural network. The method further includes outputting information related to the detected property.

One or more embodiments relates to a method for manufacturing an apparatus. The method includes forming a sensor module by forming an electromagnetic radiation sensor configured to provide the electromagnetic radiation sensor data and forming a coded mask configured to modulate the electromagnetic radiation incident to the electromagnetic radiation sensor. The method further includes forming a computation module including (or configured to emulate or run) an artificial neural network. The computation module is configured to obtain the electromagnetic radiation sensor data from the electromagnetic radiation sensor. The computation module is further configured to detect a property from the electromagnetic radiation sensor data using the artificial neural network. The computation module is further configured to output information related to the detected property.

BRIEF DESCRIPTION OF THE DRAWINGS

Some examples of apparatuses and/or methods will be described in the following by way of example only, and with reference to the accompanying Figures, in which.

DETAILED DESCRIPTION

Figure 1A:
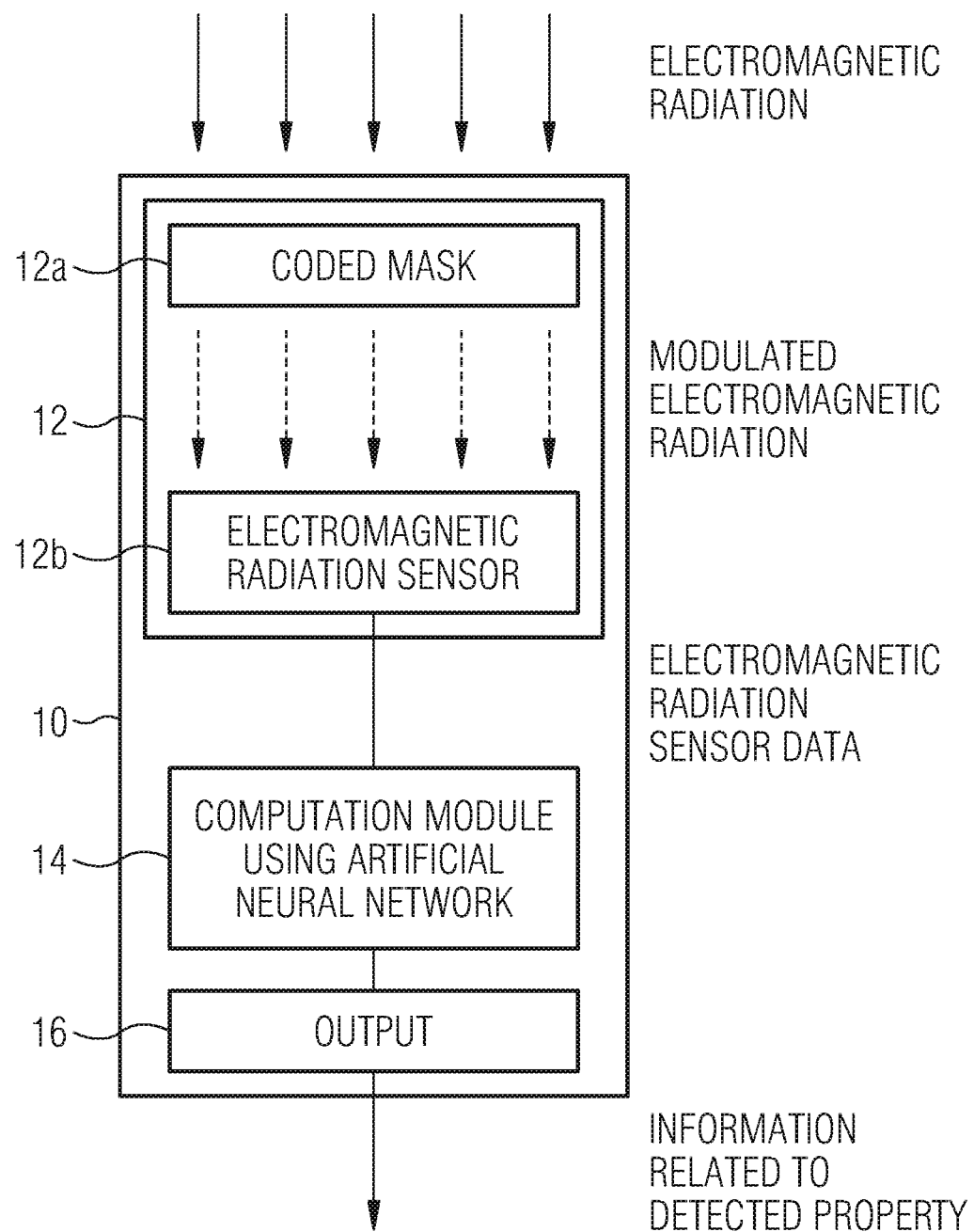
FIG. 1a shows a block diagram of an apparatus for detecting a property from electromagnetic radiation sensor data according to one or more embodiments.

Various examples will now be described more fully with reference to the accompanying drawings in which some examples are illustrated. In the Figures, the thicknesses of lines, layers and/or regions may be exaggerated for clarity.

Accordingly, while further examples are capable of various modifications and alternative forms, some particular examples thereof are shown in the Figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the Figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIG. 1 illustrates a block diagram of an apparatus 10. The apparatus 10 is suitable for detecting a property from electromagnetic radiation sensor data. The apparatus 10 comprises a sensor module 12. The sensor module comprises an electromagnetic radiation sensor 12b configured to provide the electromagnetic radiation sensor data. The sensor module 12 further comprises a coded mask 12a configured to modulate electromagnetic radiation incident to the electromagnetic radiation sensor 12b (e.g. to obtain modulated electromagnetic radiation). The apparatus 10 further comprises a computation module 14 configured to obtain the electromagnetic radiation sensor data from the electromagnetic radiation sensor 12b. The computation module 14 is further configured to detect the property from the electromagnetic radiation sensor data using an artificial neural network. The computation module 14 is further configured to output information related to the detected property via an output 16.

Using a lensless sensor module with an electromagnetic radiation sensor and an aperture-coded mask may allow for a thinner profile of the sensor module, as the electromagnetic radiation sensor and a coded mask may be arranged within a very small distance, e.g. within a smaller distance than possible in a lens-based camera system. Using an artificial neural network to detect the property within the electromagnetic radiation sensor data may enable a fast and computationally inexpensive detection of the property, as the electromagnetic radiation sensor data might not need to be transformed into an intermediary format (e.g. based on a complex de-convolution calculation required to undo the effects of the aperture-coded mask) for the artificial neural network to detect the property.

For example, the sensor module 12 may be a camera sensor module. The sensor module 12 may be configured to sense optical information, e.g. within at least one of an ultraviolet light spectrum, a visible light spectrum and an infrared light spectrum. In some embodiments, the sensor module 12 may be a lensless sensor module 12. This may enable a thinner profile of the sensor module. The coded mask 12a may be located directly adjacent to the electromagnetic radiation sensor 12b.

In some embodiments, the electromagnetic radiation sensor 12b may be an optical sensor. The electromagnetic radiation sensor 12b may be configured to sense visible light (electromagnetic (EM) radiation within a visible light spectrum). In some embodiments, the electromagnetic radiation sensor 12b may be configured to sense infrared light (EM radiation within an infrared light spectrum). In other embodiments, the electromagnetic radiation sensor 12b may be configured to sense ultraviolet light (EM radiation within an ultraviolet light spectrum). Sensing light (e.g. ultraviolet, visible or infrared light) is a common application in the detection of gestures or motion and in facial recognition. The electromagnetic radiation sensor 12b may be an active-pixel sensor. For example, the electromagnetic radiation sensor 12b may be one of a CMOS (Complementary Metal-Oxide-Semiconductor) sensor and a CCD (Charge-Coupled Device) sensor.

The electromagnetic radiation sensor 12b may be configured to provide the electromagnetic radiation sensor data as raw or unprocessed electromagnetic radiation sensor data. The raw electromagnetic radiation sensor data may be optical sensor data, which is not converted into an image format. For example, the raw electromagnetic radiation sensor data may correspond to digital values of analog values sensed by one or more sensor elements of the electromagnetic radiation sensor 12b and arranged in a pre-defined format, without further processing of the digital values. For example, the electromagnetic radiation sensor 12b may be configured to provide the electromagnetic radiation sensor data as digital values corresponding to currents, capacitances or voltages sensed by the electromagnetic radiation sensor 12b. In some embodiments, the electromagnetic radiation sensor 12b may be configured to provide the electromagnetic radiation sensor data as digital values or as analog currents or voltages to the computation module 14.

For example, the electromagnetic radiation may be or may comprise at least one of ultraviolet light, visible light and infrared light. For example, the electromagnetic radiation sensor 12b may be configured to sense at least one of ultraviolet light, visible light and infrared light. For example, the sensor module 12 may further comprise a bandpass filter (e.g. a filter 18 of FIG. 1c), configured to limit electromagnetic incident to the electromagnetic radiation sensor 12b to a desired frequency range.

Figure 1B:
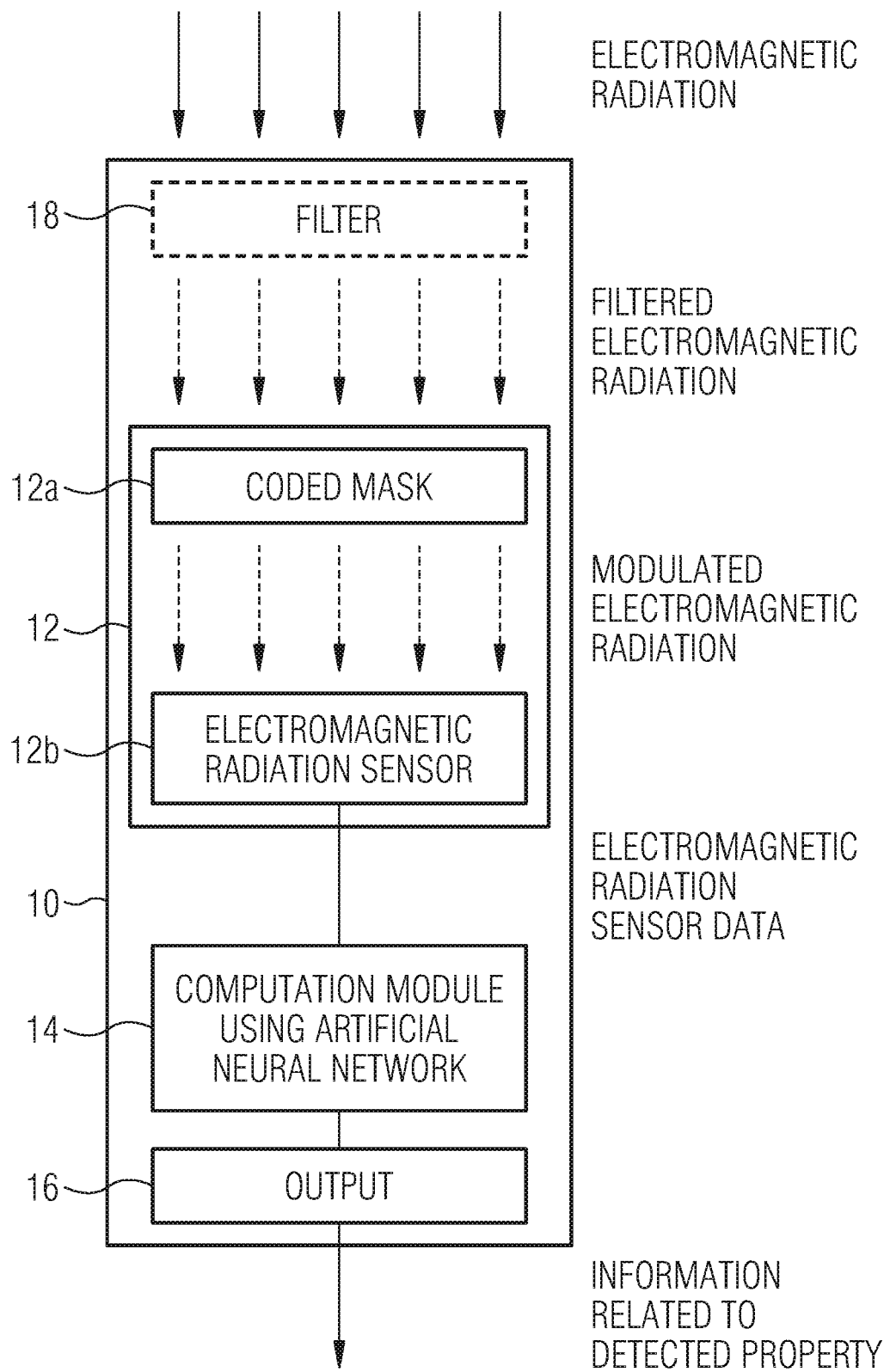
FIG. 1b shows a block diagram of an apparatus for detecting a property from electromagnetic radiation sensor data further comprising a filter according to one or more embodiments.
Figure 5:
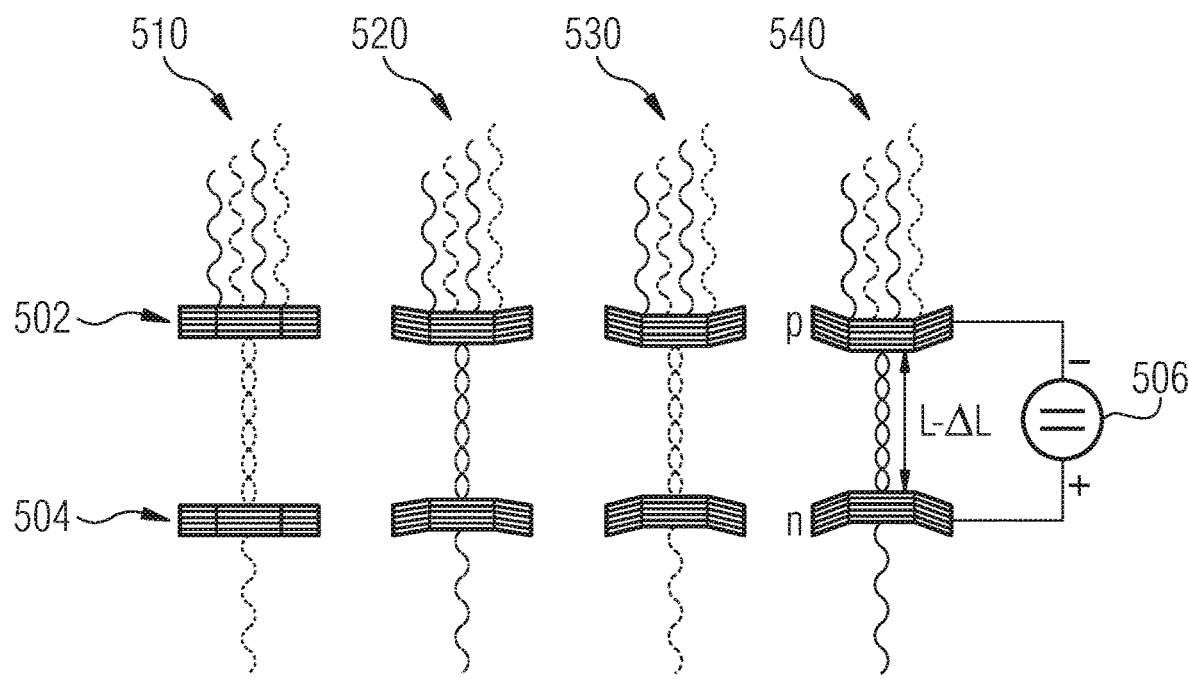
FIG. 5 shows a schematic diagram of a tunable Fabry-Pérot filter according to one or more embodiments.

In some embodiments, as shown in FIG. 1b, the sensor module may further comprise a filter 18 configured to block electromagnetic radiation outside a pre-defined frequency range (e.g. to obtain filtered electromagnetic radiation). The filter 18 may be arranged between the electromagnetic radiation sensor 12b and the coded mask 12a. Alternatively, the coded mask 12a may be arranged between the filter 18 and the electromagnetic radiation sensor 12b. Alternatively, the filter 18 may be integrated within the coded mask 12a, e.g. within a plurality of holes traversing a body of the coded mask. The filter may limit the electromagnetic radiation incident to the electromagnetic radiation sensor to a frequency range comprising the property to be detected. The pre-defined frequency range may be defined based on the property to be detected. The pre-defined frequency range may cover at least one of an ultraviolet light frequency range, a visible light frequency range and an infrared light frequency range. The sensor module 12 may further comprise an optical filter 18a configured to block light outside at least one of a visible light frequency range, an infrared light frequency range and an ultraviolet light frequency range. In at least some embodiments, the sensor module 12 may further comprise a tunable color filter 18b configured to block light outside an adjustable frequency range. The tunable color filter may be based on a tunable Fabry-Perot filter, e.g. based on two Bragg mirrors (e.g. as shown in FIG. 5). A tunable color filter may enable an adjustment of the filter based on the property to be detected or based on an ambient or background electromagnetic radiation. The computation module 14 may be configured to adjust the tunable color filter 18b based on the property of the electromagnetic radiation to be detected and/or based on ambient/background electromagnetic radiation.

In some embodiments, the coded mask 12a may be an aperture-coded optical mask. For example, the aperture-coded mask 12a may be an optical mask with a solid body (e.g. a body blocking at least 90% of electromagnetic radiation at incident to the body at a desired wavelength, e.g. at a wavelength comprising the property to be detected) and one or a plurality of holes within the solid body. For example, the aperture-coded mask 12a may comprise a plurality of holes arranged and sized in a coded pattern. The plurality of holes may vertically traverse the body of the coded mask. The plurality of holes may be of any shape in a lateral direction, e.g. round, square, rectangular, oblong, polygonal etc. The plurality of holes may occupy at least 10% (or at least 20%, at least 30%, at least 40%, at least 50%) of a surface of the body of the aperture-coded mask 12a. For example, the aperture-coded mask 12a may be one of a Modified Uniformly Redundant Array, a Hexagonal Uniformly Redundant Array, a pinhole, an aperture-coded mask with a pseudo random pattern, an aperture-coded mask with a random pattern, an aperture-coded mask with a chip-specific or chip-individual pattern, and an aperture-coded mask having a near-flat Fourier spectrum. For example, a pattern (of the plurality of holes) of the coded mask 12a may be generated individually for each sensor module 12. This may enable a manufacturing of the coded mask with higher manufacturing tolerances. For example, a pattern (of the plurality of holes) of the coded mask 12a may be a random or pseudo-random result of a forming of the coded mask 12a. For example, the aperture-coded mask 12a may be a coded binary (e.g. electromagnetic radiation is permitted to pass or not pass the aperture-coded mask 12a based on the pattern) optical mask.

Figure 4:
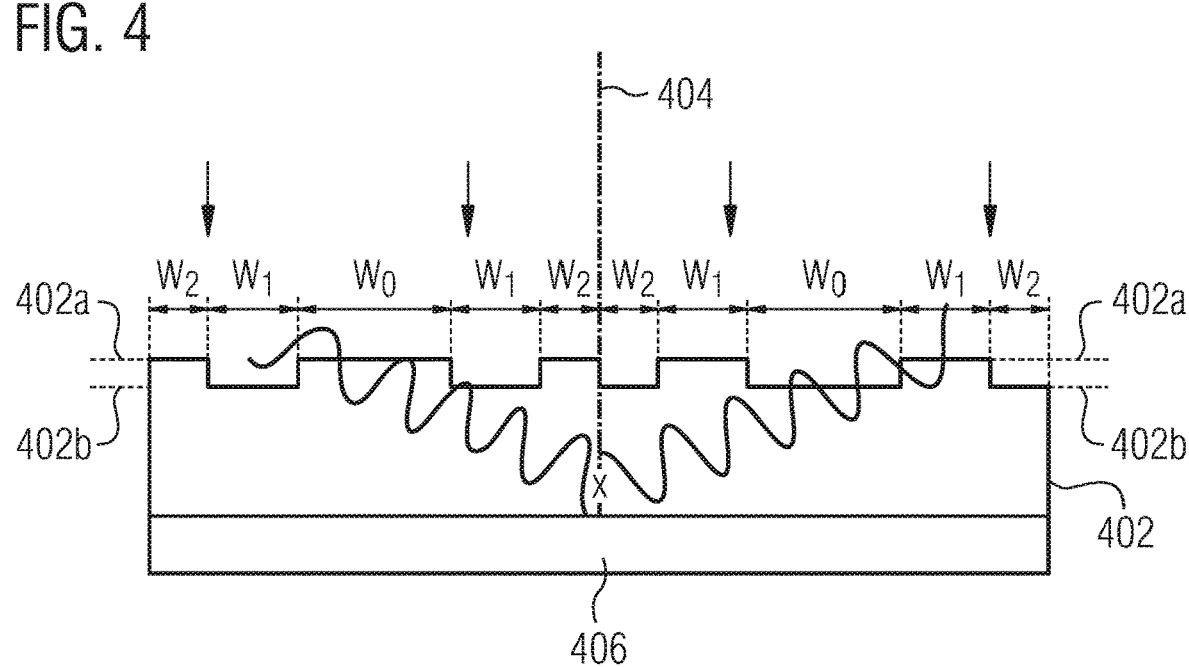
FIG. 4 shows a schematic diagram of a grate-coded mask according to one or more embodiments.

Alternatively, the coded mask 12a may be a grate-coded mask. The grate-coded mask may comprise a plurality of lateral portions. Lateral portions of a first subset of the plurality of lateral portions comprise a first vertical thickness, and lateral portions of a second subset of the plurality of lateral portions comprise a second vertical thickness. The first vertical thickness may be approximately a half-wavelength (e.g. between 40% and 60% of a wavelength) of electromagnetic radiation comprising the property to be detected larger than the second vertical thickness. Lateral portions of the first subset and lateral portions of the second subset may be arranged alternatingly, e.g. outside a lateral edge region of the grate-coded mask, a lateral portion of the first subset may be laterally directly adjacent to two lateral portions of the second subset, and a lateral portion of the second subset may be laterally directly adjacent to two lateral portions of the first subset. Furthermore, the lateral portions of the plurality of lateral portions may have two or more lateral widths. A first lateral portion of the first subset having a lateral width and a second lateral portion of the second subset having the same width may be arranged at the same distance from a center point or center line of the grate-coded mask (or of a tile of the grate-coded mask), so that the plurality of lateral portions are anti-symmetrically (lateral portions having the same width, but different thicknesses have the same lateral distance from the center point/center line) distributed around the center point or center line. The plurality of lateral portions may be arranged in a pattern, e.g. in an anti-symmetrical pattern. The plurality of lateral portions may comprise the same material. FIG. 4 shows an exemplary grate-coded mask.

According to some embodiments, a distance between the electromagnetic radiation sensor 12b and the body of the coded mask 12a may be less than 5 mm (or less than 4 mm, less than 3 mm, less than 2 mm, less than 1 mm, less than 800 µm, less than 600 µm, less than 400 µm). This may enable a thinner profile of the sensor module (and the apparatus 10). For example, the electromagnetic radiation sensor 12b may be located (directly) adjacent to the coded mask 12a, e.g. without a lens being located between the electromagnetic radiation sensor 12b and the coded mask 12a.

In at least some embodiments, the coded mask may modulate the electromagnetic radiation (e.g. the ultraviolet, visible and/or infrared light incident to the electromagnetic radiation sensor 12b) based on the pattern of the (plurality of holes of the) coded mask. The aperture-coded mask may modulate the electromagnetic radiation (incident to the electromagnetic radiation sensor 12b) based on a point-spread function of the pattern of the coded mask 12a.

In various embodiments, the computation module 14 may be configured to directly obtain the electromagnetic radiation sensor data from the electromagnetic radiation sensor 12b. For example, the electromagnetic radiation sensor data may correspond to raw or unprocessed electromagnetic radiation sensor data. This may reduce a computational complexity of the detection of the property, as artificial neural networks might be trained based on the raw or unprocessed electromagnetic radiation sensor data. In at least some embodiments, the computation module 14 may be configured to receive the electromagnetic radiation sensor data as digital data. Alternatively, the computation module 14 may be configured to obtain analog values representing the electromagnetic radiation sensor data and to convert the obtained analog values to digital electromagnetic radiation sensor data.

In at least some embodiments, the property is a property of at least one object in a vicinity of the apparatus 10. For example, the property may be or may be based on a density distribution of the modulated electromagnetic radiation across the electromagnetic radiation sensor 12b. For example, the electromagnetic radiation may be influenced by the object located in the vicinity of the apparatus 10. The at least one object may comprise a human being, e.g. a hand of a human being, a finger of a human being, a face of a human being. Alternatively, or additionally, the at least one object may be an object carried or manipulated by a human being, e.g. a tag or an identifier. Alternatively, or additionally, the at least one object may comprise some or all objects in the vicinity of the apparatus 10.

In various examples, the property of the electromagnetic radiation may be an optical property of at least one object in a vicinity of the apparatus 10, wherein the electromagnetic radiation is influenced by the at least one object. For example, the optical property of the electromagnetic radiation may be at least one of a gesture, a hand gesture, a finger gesture, a face gesture, a body gesture of a human, a face pattern, a motion of an object to be tracked and an image representation of the electromagnetic radiation. The computation module 14 may be configured to classify the optical property of the at least one object influencing the electromagnetic radiation sensor data using the artificial neural network. Classifying the optical property may enable triggering actions based on the optical property, as actions to be triggered may be linked to the classifications. In at least some embodiments, the computation module 14 may be configured to detect a pattern (e.g. a gesture, a face, or a motion) based on the electromagnetic radiation sensor data to detect the property. The computation module 14 may be configured to classify the optical property based on at least one of a plurality of learned optical properties within the electromagnetic radiation sensor data. Additionally or alternatively, the computation module 14 may be configured to perform face recognition based on the electromagnetic radiation sensor data using the artificial neural network. This may enable the face recognition within the apparatus, which may increase a privacy within the system, as the apparatus might be inaccessible to prevent external access to the facial recognition data. The artificial neural network may be trained based on one or more faces or face contours of a human being. Alternatively or additionally, the computation module 14 may be configured to identify visual tags, e.g. visual patterns identifying objects. Alternatively or additionally, the computation module 14 may be configured to perform human gesture detection or gesture interpretation based on the electromagnetic radiation sensor data using the artificial neural network. This may enable a fast and computationally inexpensive gesture detection or gesture interpretation without involvement of a host system. In at least some embodiments, the artificial neural network may be based on one or more gestures to be detected. The one or more gestures may comprise at least one element of the group of hand gestures, body gestures, face gestures, finger gestures, light gestures and drawing gestures. Alternatively or additionally, the computation module 14 may be configured to perform motion detection or motion interpretation based on the electromagnetic radiation sensor data using the artificial neural network. This may enable a fast and computationally inexpensive motion detection or motion interpretation without involvement of a host system. The motion may be a motion of a human body or a motion of a moveable object.

In some embodiments, the computation module 14 may be configured to determine an image representation of the electromagnetic radiation based on the electromagnetic radiation sensor data using the artificial neural network. For example, the image representation may represent the detected property. The image representation of the electromagnetic radiation may comprise an at least partial deconvolution of the modulated electromagnetic radiation sensed by the electromagnetic radiation sensor 12b. The image representation of the electromagnetic radiation may be a representation of the visible, infrared or ultraviolet light incident to the sensor module 12. For example, within the image representation, a convoluting effect of the aperture-coded mask 12a on the electromagnetic radiation sensed by the electromagnetic radiation sensor 12b may be at least partially reversed by the artificial neural network.

In at least some embodiments, the computation module 14 may be configured to detect the property using the artificial neural network without computing an image representation of the electromagnetic radiation sensor data. The artificial neural network may be configured to detect the property based on the raw or unprocessed electromagnetic radiation sensor data.

The artificial neural network may be a trained or pre-trained artificial neural network. In some embodiments, the artificial neural network may be trained based on the aperture coded-mask and based on the property to be detected. For example, the artificial neural network may be trained within the computation module 14. This may enable manufacturing the aperture-coded mask with high manufacturing tolerances. In various embodiments, the computation module 14 may be configured to at least partially train the artificial neural network based on the aperture-coded mask. A partially-trained artificial neural network may be loaded into the computation module 14 (e.g. trained based on the property to be detected), and the computation module 14 may be configured to extend the training of the artificial neural network based on the coded mask 12a. Alternatively (or additionally), an at least partially trained artificial neural network may be loaded into the computation module 14. In some embodiments, the at least partially trained artificial neural network may be trained based on the electromagnetic radiation sensor data of the electromagnetic radiation sensor 12b, for example within an external device (e.g. a workstation or a server). This may eliminate or reduce a time-intensive training of the artificial neural network on the chip. In some embodiments, the artificial neural network may be a pre-trained artificial neural network.

In various embodiments, the computation module 14 may comprise a general-purpose processing unit configured to emulate or execute the artificial neural network. This may enable an implementation of the artificial neural network using existing processor technology. Alternatively, the artificial neural network may be implemented using dedicated hardware for nodes and interconnections (e.g. weighted interconnections) between nodes. For example, the artificial neural network may be implemented using resistive random-access memory elements to configure its function. This may provide an implementation of the artificial neural network with a reduced size on the chip. Artificial neural networks, e.g. the artificial neural network used by the computation module 14, may be realized using different architectures, for example architectures having at least one element of the group of a feedforward neural network, a recurrent neural network, a probabilistic neural network, a time delay neural network, a regulatory neural network and a spiking neural networks. Artificial neural networks may employ different numbers of hidden layers (e.g. layers of neurons that are not directly connected to inputs or outputs), where more hidden layers may allow realizing more complex functions, but may complicate the training of the artificial neural network (e.g. deep neural networks vs. shallow neural networks). In some embodiments, the artificial neural network may comprise at least two hidden layers. In other embodiments, the artificial neural network may comprise at least three or at least four hidden layers. The usage of more hidden layers may improve a quality of the detection of the property.

In at least some embodiments, the computation module 14 may comprise a general purpose processing unit configured to process the detected property to generate a control signal to control an external entity. This may enable to use the apparatus without a host to control the external entity. The computation module 14 may be implemented using one or more processing units, one or more processing devices, any means for processing, such as a processor, a computer or a programmable hardware component being operable with accordingly adapted software. In other words, the described function of the computation module 14 may as well be implemented in software, which is then executed on one or more programmable hardware components. Such hardware components may comprise a general purpose processor, a Digital Signal Processor (DSP), a micro-controller, etc. The general purpose processing unit may be further configured to train, emulate or run the artificial neural network. The control module 14 may be configured to provide the control signal to control a mobile device based on gestures of a user of the mobile device represented by the electromagnetic radiation. For example, the external entity may be one of a robot, a machine tool, a vehicle, an electronic lock, a monitor, a TV set, an electronic game, a game controller, a kitchen equipment, a household appliance, a device configured to be actively controlled and a device configured to react to its environment.

The information related to the detected property may comprise a digital or analog representation of the detected property. In various embodiments, the information related to the detected property may be based on a packet format comprising a bit code or bit sequence representing the detected property. The information related to the detected property may comprise a digital representation of a classification of the detected property, e.g. a detected gesture according to a classification of gestures or a detected motion according to a classification of motion. For example, the information related to the detected property may indicate that a known face was detected.

In some embodiments, the sensor module 12 and the computation module 14 may be implemented on a single chip. For example, both the sensor module 12 and the computation module 14 may be implemented within or on the same semiconductor substrate. In at least some embodiments, the computation module 14 and the electromagnetic radiation sensor 12b may be implemented within the same semiconductor substrate, and the coded mask 12a may be implemented within or on the same semiconductor substrate. Alternatively, the sensor module 12 and the computation module 14 may be implemented using a chip stack. In some other embodiments, the sensor module 12 may be implemented within a first chip of the chip stack and the computation module 14 may be implemented within a second chip of the chip stack. Alternatively, the electromagnetic radiation sensor 12b may be implemented within the first chip and the coded mask 12a may be arranged on the first chip. Alternatively, or additionally, the sensor module 12 and the computation module 14 may be implemented within the same semiconductor package. Forming the sensor module and the computation module on the same chip/substrate/package may reduce a size of an apparatus while reducing costs of manufacturing the apparatus, as a number of steps required to manufacture the apparatus may be reduced.

The vertical direction and a vertical dimension or thicknesses of layers may be measured orthogonal to a front side surface of the electromagnetic radiation sensor 12b and a lateral direction and lateral dimensions may be measured in parallel to the front side surface of the electromagnetic radiation sensor 12b.

The vertical direction and a vertical dimension or thicknesses of layers may be measured orthogonal to a front side surface of the electromagnetic radiation sensor 12a and a lateral direction and lateral dimensions may be measured in parallel to the front side surface of the electromagnetic radiation sensor 12a.

The output 16 may correspond to an interface for transmitting information, which may be represented by digital (bit) values according to a specified code or protocol, within a module, between modules, or between modules of different entities.

Figure 1C:
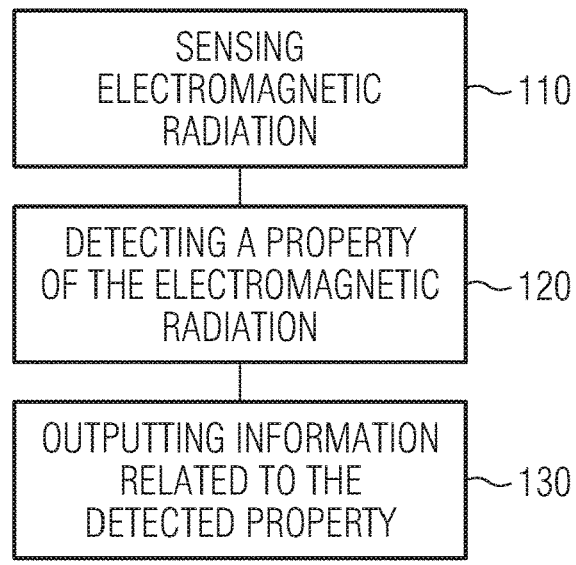
FIG. 1c shows a flow chart of a method for detecting a property from electromagnetic radiation sensor data according to one or more embodiments.

FIG. 1c shows a flow chart of a (corresponding) method for detecting a property from electromagnetic radiation sensor data. The method comprises sensing 110 electromagnetic radiation modulated by a coded mask to obtain electromagnetic radiation sensor data. The method further comprises detecting 120 a property from the electromagnetic radiation sensor data using an artificial neural network. The method further comprises outputting 130 information related to the detected property.

Using a (lensless) sensor module with an electromagnetic radiation sensor and a coded mask may allow for a thinner profile of the sensor module, as the electromagnetic radiation sensor and a coded mask may be arranged within a very small distance. Using an artificial neural network to detect the property within the electromagnetic radiation sensor data may enable a fast and computationally inexpensive detection of the property, as the electromagnetic radiation sensor data might not need to be transformed into an intermediary format (e.g. based on a complex de-convolution calculation required to undo the effects of the coded mask) for the artificial neural network to detect the property. Using an artificial neural network to locally detect the property within the electromagnetic radiation sensor data may enable a power-efficient detection of the property, as the electromagnetic radiation sensor data might not need to be transferred to a remote server for the server to detect the property.

More details and aspects of the method are mentioned in connection with the proposed concept or one or more examples described above (e.g. FIG. 1a to 1b). The method may comprise one or more additional optional features corresponding to one or more aspects of the proposed concept or one or more examples described above or below.

Figure 2:
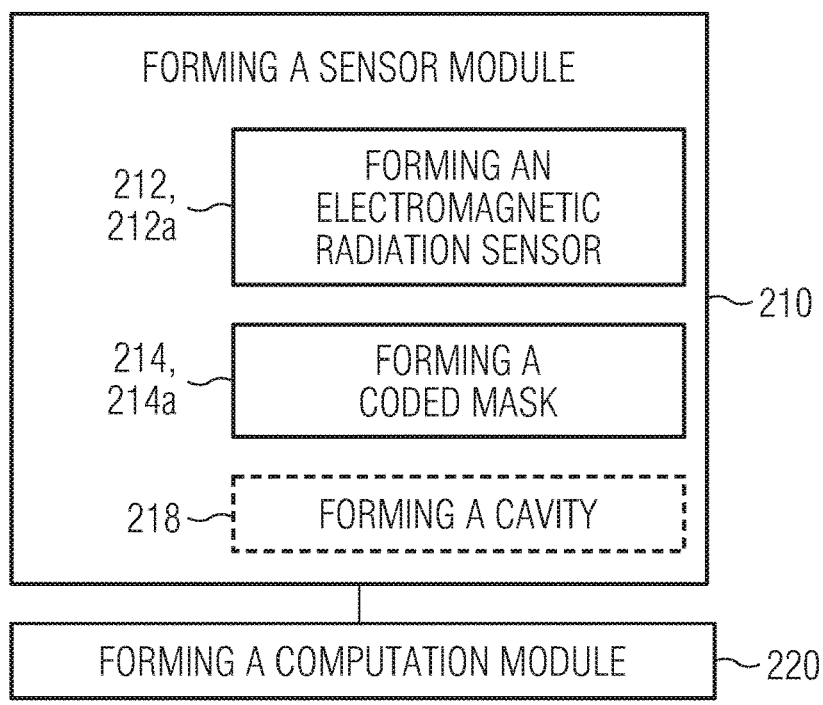
FIG. 2 shows a flow chart of a method for manufacturing an apparatus according to one or more embodiments.

FIG. 2 shows a flow chart of a method for manufacturing or forming an apparatus, e.g. for forming the apparatus 10 of FIGS. 1a-1b. The apparatus may be implemented similar to the apparatus 10 of FIGS. 1a-1b. The method comprises forming 210 a sensor module (e.g. the sensor module 12 of FIGS. 1a-1b) by forming 212 an electromagnetic radiation sensor configured to provide the electromagnetic radiation sensor data and forming 214 a coded mask configured to modulate the electromagnetic radiation incident to the electromagnetic radiation sensor. The method further comprises forming 220 a computation module (e.g. the computation module 14 of FIGS. 1a-1b) comprising (or configured to emulate or run) an artificial neural network. The computation module is configured to obtain the electromagnetic radiation sensor data from the electromagnetic radiation sensor. The computation module is further configured to detect a property from the electromagnetic radiation sensor data using the artificial neural network. The computation module is further configured to output information related to the detected property.

Using a lensless sensor module with an electromagnetic radiation sensor and a coded mask may allow for a thinner profile of the sensor module, as the electromagnetic radiation sensor and a coded mask may be arranged within a very small distance. Using an artificial neural network to detect the property from the electromagnetic radiation sensor data may enable a fast and computationally inexpensive detection of the property, as the electromagnetic radiation sensor data might not need to be transformed into an intermediary format (e.g. based on a complex de-convolution calculation required to undo the effects of the coded mask) for the artificial neural network to detect the property.

The forming of the computation module may further comprise at least partially training the artificial neural network using the computation module based on the coded mask. This may enable an adaptation of the artificial neural network to the (e.g. device/chip-individual) coded mask. For example, the training of the artificial neural network using the computation module may be based on a plurality of electromagnetic radiation training samples emitted towards the sensor module and a plurality of desired outputs for the plurality of electromagnetic radiation training samples. The sensor module may be configured to sense the plurality of electromagnetic radiation training samples, and the artificial neural network may be configured to adapt based on the plurality of electromagnetic radiation training samples and based on the plurality of desired outputs. In some embodiments, the training of the artificial neural network may be performed within an external device based on the electromagnetic radiation sensor data of the apparatus. Alternatively, the training of the artificial neural network may be performed within the computation module.

Alternatively or additionally, the forming of the computation module may further comprise loading information related to a pre-trained artificial neural network into the computation module to obtain the artificial neural network. This may enable a faster manufacturing of the apparatus compared to training the artificial neural network using the computation module. The forming of the computation module may further comprise adjusting the pre-trained artificial neural network based on the coded mask, e.g. by extending a training of the pre-trained artificial neural network using the plurality of electromagnetic radiation training samples and the plurality of desired outputs.

In at least some embodiments, the forming 210 of the sensor module may comprise forming 212a the electromagnetic radiation sensor within a semiconductor substrate of a semiconductor device comprising the apparatus. The forming 210 of the sensor module may further comprise forming 214a the coded mask on or within the semiconductor substrate. For example, the forming 210 may further comprise forming an intermediary layer on at least parts of the sensor module before forming 214 the coded mask. The forming 210 of the sensor module may further comprise forming 216 a cavity between the electromagnetic radiation sensor and the coded mask. The forming 216 of the cavity may comprise removing the intermediary layer. A vertical distance between the electromagnetic radiation sensor and the coded mask within the cavity may be less than 1 mm (or less than 800 μm, less than 600 μm, less than 500 μm, less than 400 μm, less than 300 μm, less than 200 μm, less than 100 μm). This may allow for a thinner profile of the sensor module.

More details and aspects of the method are mentioned in connection with the proposed concept or one or more examples described above (e.g. FIG. 1a to 1c). The method may comprise one or more additional optional features corresponding to one or more aspects of the proposed concept or one or more examples described above or below.

At least some embodiments relate to a lensless smart optical sensor with an artificial neural network (aNN). At least some embodiments may relate to an integrated system on a chip that may allow to realize low-profile, low-cost, low-power smart optical sensors, e.g. for gesture detection and interpretation, motion detection and interpretation and/ or other similar tasks of classifying optical information.

At least some embodiments may combine (preferably on a single chip) a lensless camera system (comprising an aperture coded mask and an optical sensor), e.g. the sensor module 12 of FIGS. 1a-1b, with an artificial neural network (aNN) (e.g. of the computation module 14 of FIGS. 1a-1b) that directly analyses the output of the camera, e.g. to achieve a thin (i.e. low-profile) system that may replace much more expensive and power-hungry setups in applications, where optical (visible light, IR, UV, . . . ) information (typically a picture or sequence of pictures) may be classified. At least some embodiments may be based on combining a "coded mask" with an "aNN" for picture analysis.

Compared to other systems comprising a lens and a sensor, which are used to generate a picture, and where the picture is analyzed by a central processing unit (CPU), various embodiments may be cheaper (no lens) and thinner (less distance of mask to sensor).

Compared to systems comprising an (aperture) coded mask and a sensor, whose output is reconstructed by de-convolution to a picture, and where the picture is then analyzed by a CPU, at least some embodiments may be even cheaper, consume less power, and may avoid privacy concerns. The aNN may be trained specifically.

Figure 3:
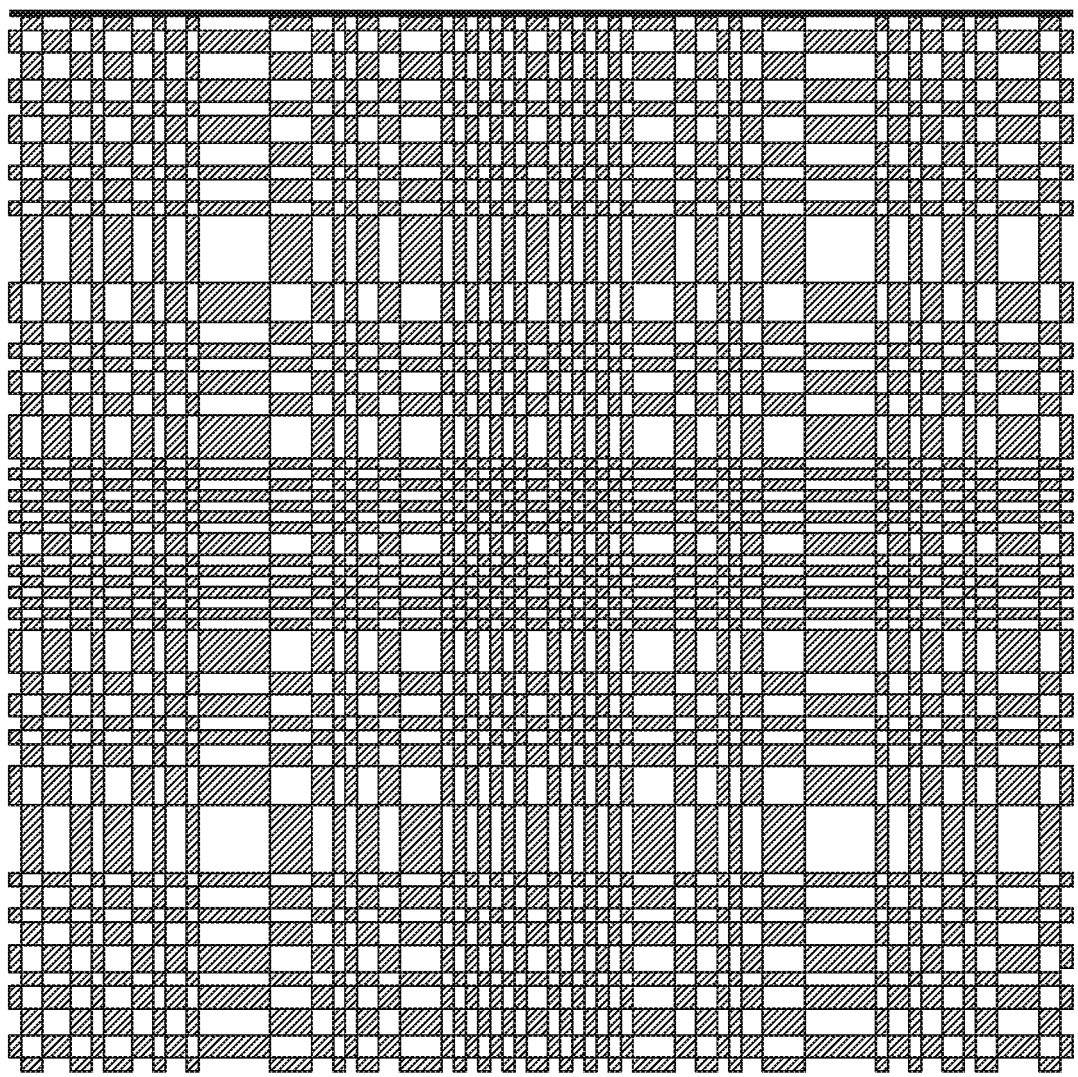
FIG. 3 shows a schematic top view of an aperture-coded mask according to one or more embodiments.

In at least some embodiments, aperture-coded masks may work like multiple-pinhole cameras. The special structure of the mask may allow performing de-convolution after recording the image modulated by the aperture-coded mask. FIG. 3 shows a pattern of an exemplary aperture-coded mask comprising a modified uniformly redundant array (MURA).

FIG. 4 shows a pattern of another coded mask with a phase anti-symmetric grating. In at least some embodiments, the coded mask of FIG. 4 may be used instead of aperture-coded masks. FIG. 4 shows a grate structure 402 comprising an anti-symmetric grating. The grate structure 402 comprises a plurality of lateral portions. A first subset of the plurality of lateral portions having an upper surface ending at 402a comprise a first larger thickness t1 in vertical direction, and a second subset of the plurality of lateral portions having an upper surface ending at 402b comprises a second smaller thickness t2 in the vertical direction. The plurality of portions have different widths w0, w1 and w2, which are anti-symmetrically arranged around a curtain 404. A sensor 406 is arranged vertically below the grate structure 402.

Some embodiments may be based on a "coded mask" with an "aNN" for picture analysis. For example, if a precisely manufactured integrated coded mask is used, a pre-trained aNN may be loaded into the chip and there might be no necessity for online learning (which may be inflexible yet a simple and cheap implementation of the aNN). Alternatively, an imprecise coded mask or a randomly coded mask (integrated or assembled) may be used, where at least some chip-by-chip training of the aNN may be necessary. For example, a read-out of sensor data output for a sample object may be performed, and an aNN may be trained using a Computer (e.g. a Personal Computer) with actual chip-individual sensor data, and the individually trained aNN may be loaded into the chip.

In at least some embodiments, a scene may be sensed by a sensor behind a mask. A spacing (or thickness) between the sensor and the mask may be around 0.5 mm, for example. The sensor measurements may be provided to an ANN with an input layer, one or more (e.g. three) hidden layers and an output layer, and the aNN may signalize a feature(s) detection. The sensor and the mask may be implemented on a single mark-sensor assembly, for example on the same chip or within the same package.

At least some embodiments may be based on deploying artificial intelligence at the edge of the network, as it may enable improved safety, privacy and economy, prompting the industry to process data at the end node. Data may be transformed as early as possible. Not transmitting all the images collected from (multiple) cameras to trigger an action might also reduce power, cost and data size.

At least some embodiments may comprise an extension, a filter such as a color filter in front of or behind the aperture-coded mask. The color filter may be an additional color filter, or a color filter combined with the aperture-coded mask, and may allow to limit a color range (i.e. wavelength) of the input (e.g. of the electromagnetic radiation).

A combination of at least some embodiments with an integrated tunable Fabry-Pérot wavelength filter may allow to dynamically select a color range; the selected color may be tunable with a voltage. FIG. 5 shows an exemplary tunable Fabry-Pérot wavelength filter based on two Bragg mirrors 502, 504, which may be configured to pass electromagnetic radiation corresponding to red light 510, orange light 520, green light 530 and blue light 540 by adjusting a voltage 506.

At least some embodiments of the apparatus may comprise an aperture coded mask, a sensor, an aNN and an output (all integrated, e.g. on a chip or within a package). Different mask types of the aperture-coded mask may be MURA, hexagonal (HURA), pseudo random, random, or chip-individual (masks). A distance of the (coded) mask to sensor may be small, the mask may essentially be directly on top of the sensor. For example, the apparatus may be lensless. The sensor may be a sensor for visible light or part of its spectrum (e.g. with an extra filter blocking electromagnetic radiation outside the visible light spectrum). Alternatively or additionally, the sensor may be sensor for IR (Infrared) light or thermal emission or part of its spectrum for example with an extra filter blocking electromagnetic radiation outside the infrared spectrum. Alternatively or additionally, the sensor may be a sensor for UV (Ultraviolet) light or part of its spectrum (e.g. with an extra filter blocking electromagnetic radiation outside the ultraviolet spectrum).

In various embodiments, the apparatus may comprise different aNN types, e.g. with or without self-learning (e.g. pre-trained). For example, the aNN may be implemented using RRAM.

For example, a color filter for incident electromagnetic radiation may be added to the apparatus. For example, a tunable color filter may be added, e.g. a tunable Fabry-Pérot wavelength filter. For example, the aNN and the sensor may be integrated, e.g. within the same semiconductor (e.g. silicon) substrate or using stacked chips using through-silicon vias. For example, the apparatus may comprise an integrated microcontroller for even smarter sensor applications. For example, the apparatus may be configured to perform face recognition, gesture detection, and/or motion detection.

More details and aspects of the lensless smart optical sensor are mentioned in connection with the proposed concept or one or more examples described above (e.g. FIG. 1a to 2). The lensless smart optical sensor may comprise one or more additional optional features corresponding to one or more aspects of the proposed concept or one or more examples described above or below.

The aspects and features mentioned and described together with one or more of the previously detailed examples and Figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the Figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus comprising:
a sensor module comprising:
an electromagnetic radiation sensor configured to generate electromagnetic radiation sensor data;
a coded mask configured to modulate electromagnetic radiation incident to the electromagnetic radiation sensor and from which the electromagnetic radiation sensor data is generated; and
at least one processor configured to:
obtain the electromagnetic radiation sensor data from the electromagnetic radiation sensor,
detect a property from the electromagnetic radiation sensor data using an artificial neural network, and
output information related to the detected property via an output,
wherein the sensor module further comprises a filter configured to block electromagnetic radiation outside a pre-defined frequency range.

2. The apparatus according to claim 1, wherein:
the electromagnetic radiation sensor data corresponds to raw electromagnetic radiation sensor data, and
the at least one processor is configured to detect the property using the artificial neural network without computing an image representation of the electromagnetic radiation sensor data.

3. The apparatus according to claim 1, wherein the sensor module is a lensless sensor module.

4. The apparatus according to claim 1, wherein the sensor module and the at least one processor are arranged according to at least one of:
the sensor module and the at least one processor are implemented on a single chip,
the sensor module and the at least one processor are implemented within or on a same semiconductor substrate,
the sensor module and the at least one processor are implemented within a same semiconductor package, or
the sensor module and the at least one processor are implemented using a chip stack.

5. An apparatus comprising:
a sensor module comprising:
an electromagnetic radiation sensor configured to generate electromagnetic radiation sensor data;
a coded mask configured to modulate electromagnetic radiation incident to the electromagnetic radiation sensor and from which the electromagnetic radiation sensor data is generated; and
at least one processor configured to:
obtain the electromagnetic radiation sensor data from the electromagnetic radiation sensor,
detect a property from the electromagnetic radiation sensor data using an artificial neural network, and
output information related to the detected property via an output,
wherein the coded mask is an aperture-coded mask, and
wherein the aperture-coded mask is one of a Modified Uniformly Redundant Array, a Hexagonal Uniformly Redundant Array, a pinhole, an aperture-coded mask with a pseudo random pattern, an aperture-coded mask with a random pattern, an aperture-coded mask with a chip-specific or chip-individual pattern, an aperture-coded mask having a near-flat Fourier spectrum, or an aperture-coded optical mask.

6. The apparatus according to claim 1, wherein the coded mask is a grate-coded mask.

7. The apparatus according to claim 1, wherein:
a distance between the electromagnetic radiation sensor and the coded mask is less than 5 mm,
the electromagnetic radiation incident to the electromagnetic radiation sensor is at least one of ultraviolet light, visible light, or infrared light, and
the property is an optical property of at least one object in a vicinity of the apparatus, wherein the electromagnetic radiation incident to the electromagnetic radiation sensor is influenced by the at least one object.

8. The apparatus according to claim 1, wherein the electromagnetic radiation sensor is configured to sense at least one of visible light, infrared light, or ultraviolet light.

9. The apparatus according to claim 1, wherein the filter is an optical filter configured to block light outside at least one of a visible light frequency range, an infrared light frequency range, or an ultraviolet light frequency range.

10. The apparatus according to claim 1, wherein the sensor module further comprises a tunable color filter configured to block light outside an adjustable frequency range.

11. The apparatus according to claim 1, wherein the artificial neural network is implemented using resistive random-access memory elements to configure its function.

12. The apparatus according to claim 1, wherein:
the at least one processor is configured to process the detected property to generate a control signal to control an external entity, and
the at least one processor is configured to emulate the artificial neural network.

13. The apparatus according to claim 1, wherein:
the at least one processor is configured to classify an optical property of at least one object influencing the electromagnetic radiation incident to the electromagnetic radiation sensor using the artificial neural network, and
the at least one processor is configured to perform at least one of:
facial recognition or facial interpretation based on the electromagnetic radiation sensor data using the artificial neural network,
gesture detection or gesture interpretation based on the electromagnetic radiation sensor data using the artificial neural network,
motion detection or motion interpretation based on the electromagnetic radiation sensor data using the artificial neural network, or
determination of an image representation of the electromagnetic radiation incident to the electromagnetic radiation sensor based on the electromagnetic radiation sensor data using the artificial neural network.

14. The apparatus according to claim 1, wherein the artificial neural network comprises at least two hidden layers.

15. The apparatus according to claim 1, wherein the at least one processor is configured to at least partially train the artificial neural network based on the coded mask, or
wherein the artificial neural network corresponds to a pre-trained artificial neural network.

16. A method comprising:
sensing modulated electromagnetic radiation modulated by a coded mask to generate electromagnetic radiation sensor data;

blocking electromagnetic radiation outside a pre-defined frequency range to obtain filtered electromagnetic radiation, wherein the electromagnetic radiation outside the pre-defined frequency range is filtered from the modulated electromagnetic radiation or from pre-modulated electromagnetic radiation;

detecting a property from the electromagnetic radiation sensor data using an artificial neural network; and outputting information related to the detected property.

17. A method for manufacturing an apparatus, the method comprising:

forming a sensor module by:

forming an electromagnetic radiation sensor configured to provide the electromagnetic radiation sensor data;

forming a coded mask configured to modulate the electromagnetic radiation incident to the electromagnetic radiation sensor; and forming at least one processor comprising an artificial neural network, wherein the at least one processor is configured to:

obtain the electromagnetic radiation sensor data from the electromagnetic radiation sensor, detect a property from the electromagnetic radiation sensor data using the artificial neural network, and output information related to the detected property, wherein forming the at least one processor further comprises at least partially training the artificial neural network using the at least one processor based on the coded mask, or wherein forming of the at least one processor further comprises loading information related to a pre-trained artificial neural network into the at least one processor to obtain the artificial neural network.

18. The method according to claim 17, wherein forming of the sensor module comprises:

forming the electromagnetic radiation sensor within a semiconductor substrate of a semiconductor device comprising the apparatus;

forming the coded mask on or within the semiconductor substrate; and forming a cavity between the electromagnetic radiation sensor and the coded mask, wherein a vertical distance between the electromagnetic radiation sensor and the coded mask within the cavity is less than 1 mm.

19. The apparatus according to claim 1, wherein:

the coded mask is an aperture-coded mask, and the aperture-coded mask is one of a Modified Uniformly Redundant Array, a Hexagonal Uniformly Redundant Array, a pinhole, an aperture-coded mask with a pseudo random pattern, an aperture-coded mask with a random pattern, an aperture-coded mask with a chip-specific or chip-individual pattern, an aperture-coded mask having a near-flat Fourier spectrum, or an aperture-coded optical mask.

20. The apparatus according to claim 5, wherein the sensor module further comprises a filter configured to block electromagnetic radiation outside a pre-defined frequency range.

* * * * *

UNITED STATES PATENT AND TRADEMARK OFFICE
CERTIFICATE OF CORRECTION

PATENT NO.         : 11,620,507 B2
APPLICATION NO.    : 15/983736
DATED              : April 4, 2023
INVENTOR(S)        : Jan Otterstedt It is certified that error appears in the above-identified patent and that said Letters Patent is hereby corrected as shown below:

In the Claims

Claim 17:
Column 17, Line 15, change "provide the electromagnetic radiation sensor data;" to --provide electromagnetic radiation sensor data;--

Claim 17:
Column 17, Lines 16-17, change "forming a coded mask configured to modulate the electromagnetic radiation incident to the electromagnetic" to --forming a coded mask configured to modulate electromagnetic radiation incident to the electromagnetic--

Signed and Sealed this
Ninth Day of May, 2023

Katherine Kelly Vidal
*Director of the United States Patent and Trademark Office*